Oct. 3, 1967        R. D. MILTON        3,344,703
                    LASER DETECTOR

Filed Oct. 4, 1963                    2 Sheets-Sheet 1

Richard D. Milton,
       *INVENTOR.*

Oct. 3, 1967  R. D. MILTON  3,344,703
LASER DETECTOR

Filed Oct. 4, 1963  2 Sheets-Sheet 2

Richard D. Milton,
*INVENTOR.*

3,344,703
LASER DETECTOR
Richard D. Milton, Huntsville, Ala., assignor to the United States of America as represented by the Secretary of the Army
Filed Oct. 4, 1963, Ser. No. 314,075
1 Claim. (Cl. 88—23)

ABSTRACT OF THE DISCLOSURE

A container is divided into two channels with openings and two partial reflecting plates positioned so as to reflect a small part of the radiation passing through the first channel into the second channel. This part of the radiation is passed through a filter and diffuser to a photosensitive diode located in the second channel. The diode is connected in a series circuit with a D.C. source, resistor, and a capacitor. Meters are connected across the resistor and across the capacitor for measuring the instantaneous power and total energy of the radiation.

---

The invention described herein may be manufactured and used by or for the Government for governmental purposes without the payment of any royalty thereon.

This invention relates to light measuring, such as laser light, and detecting devices of the type employing photosensitive diodes as a control element to the input of a meter. More particularly this invention relates to the measurement of both the instantaneous power and total energy of laser light.

Research in laser light has brought into prominence the need for a suitable detector for the measurement of laser light energy. In performing Laser research of nearly any type one finds it necessary to measure, and record, both instantaneous power and total energy of the laser light used in the experiment. The great amount of power involved in some of the laser beams makes direct beam measurements impracticable. Further, the use of a detector must not appreciably substract from the total laser light energy.

Conventional methods of detecting both the instantaneous power and total energy of laser light involves the use of two devices. One to detect the instantaneous power, and the other to detect total energy. These conventional detectors suffer from lower sensitivity.

It is, therefore, and object of this invention to provide a detector suitable for use in laser research.

Another object of this invention is to provide a reduction in the number of component parts in a laser detector, along with increased sensitivity.

A further object of the present invention is to provide an out of the beam measurement of a laser beam.

A still further object is to provide a single device for detecting both the instantaneous power and the total energy of laser light.

Yet another object of the invention is to provide a device for finding both the power and the total energy of the same laser pulse, as opposed to energy for one pulse and power for the next pulse.

These and other objects and advantages of the present invention will become apparent from the following detailed description and from the accompanying drawings, in which.

Figure 1:
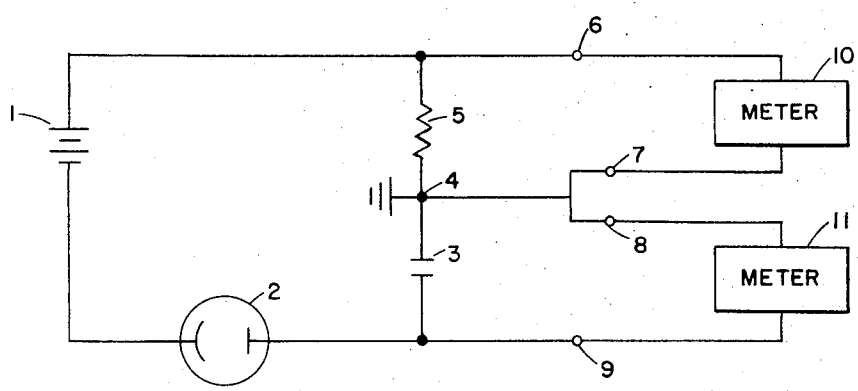
FIGURE 1 is a schematic circuit diagram according to the invention.

Referring to FIGURE 1 reference numeral 1 designates a source of D.C. voltage which may be a D.C. generator, battery or the like. Connected in a series loop with a source 1 are photosensitive element 2, capacitor 3, junction 4 and resistor 5. Connected to junction 4 are terminals 7 and 8, and ground. Across resistor 5 by way of terminals 6 and 7 is connected meter 10. Across capacitor 3 by way of terminals 8 and 9 is connected meter 11. Meters 10 and 11 are oscilloscopes, oscillographs or other conventional meters. Photosensitive element 2 is a photosensitive diode or other conventional photosensitive device.

Photosensitive element 2 is exposed to a proportion of the light source to be measured. Since the impedance of diode 2 is proportional to the amount of light it receives, the current flow through capacitor 3 and resistor 5 is also proportional to the amount of light diode 2 receives. Meter 10 will, therefore, measure the instantaneous power of a light source as the voltage drop across resistor 5 is directly proportional to the current flow therein. Meter 11 will measure the voltage across capacitor 3. The capacitor sums the charge released by the photosensitive diode, and since capacitor voltage is a direct function of charge, the voltage across the capacitor is a direct function of total energy of the light source. Meter 11, therefore, measures a value which is directly proportional to the total energy of the light source.

Capacitor 3 is made large relative to resistor 5, D.C. source 1 and the total amount of energy detected by diode 2 so that the voltage drop across it will not appreciably affect the instantaneous power reading of meter 10. Capacitor 3 will slowly discharge through the meter 11 after the experiment is over.

Figure 2:
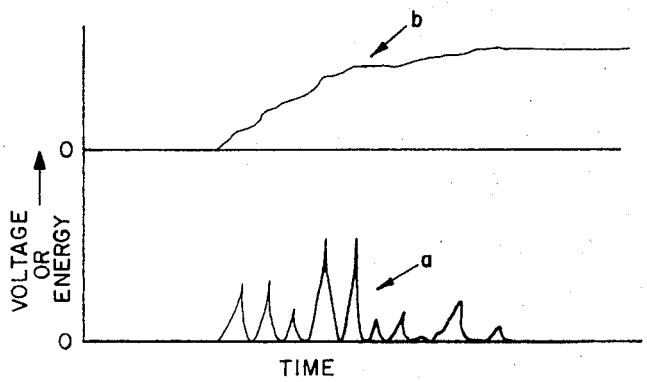
FIGURE 2 shows waveforms illustrative of the operation of the invention, wherein the axis of abscissa is time and the axis of ordinate is voltage or energy.

FIGURE 2 shows at curve $a$ the voltage across resistor 5 of FIGURE 1. This curve $a$ is the same as is read by meter 10 which represents the instantaneous power of a light source. Curve $b$ shows the voltage across capacitor 3 which is that measured by meter 11 to give a total energy representation of the light source.

Figure 3:
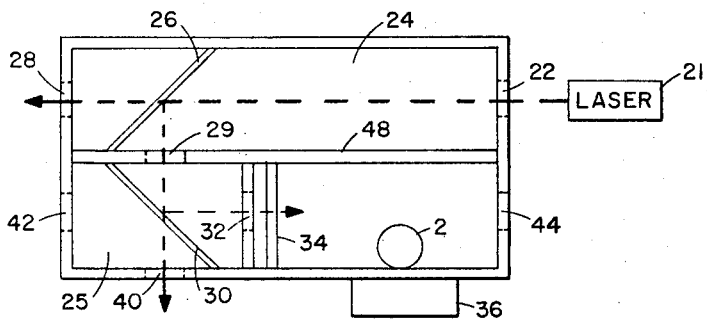
FIGURE 3 illustrates a top view of a preferred embodiment of the invention.
Figure 4:
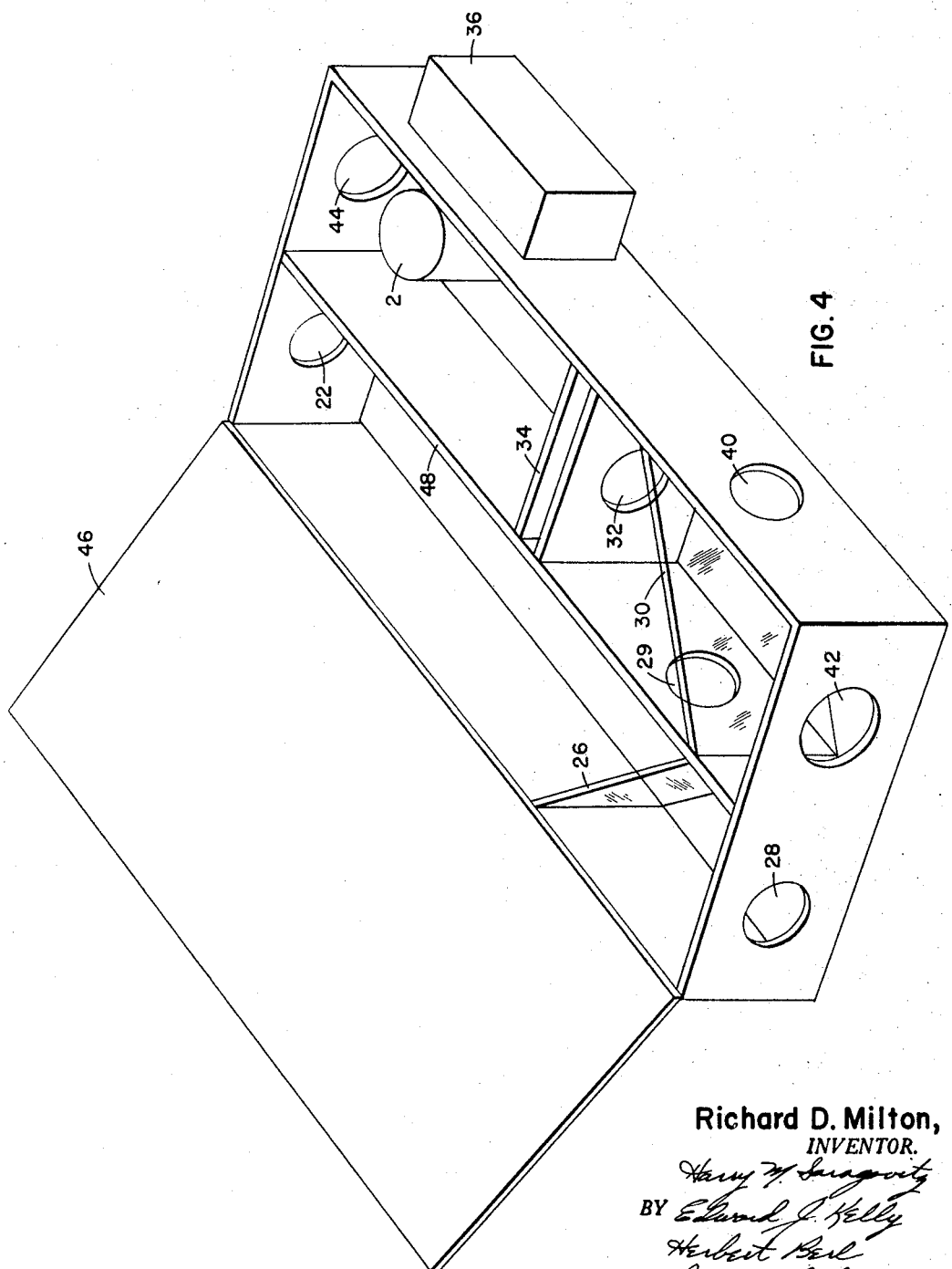
FIGURE 4 is a perspective view of a preferred embodiment of the present invention.

FIGURES 3 and 4 represent the structure of the detector. The detector comprises a closed container which is divided into a first channel 24 and a second channel 25 by a wall 48. Two aligned circular holes 22 and 28 are positioned at opposite ends of the channel 24. A glass plate 26 is placed in channel 24 at an angle and towards one end of the channel. In channel 25 are four circular holes 29, 40, 42 and 44. Holes 42 and 44 are aligned at opposite ends of channel 25 in the same manner as holes 22 and 28. Hole 29 is in wall 48 and is placed towards the same end of the container as glass plate 26. Hole 40 is aligned with hole 29. A glass plate 30 is positioned in channel 25 at an angle and at the same end as holes 29 and 40. An optical band pass dielectric filter 32 and a diffuse surface element 34 are positioned towards the center of channel 25. At the other end of channel 25 is placed photosensitive diode 2. The circuit elements 1 and 3–9 of FIGURE 1 are attached to the detector by means of a container 36. A lid 46 is provided for access to the inside of the container. The detector framework is made out of wood or any other conventional material.

Laser light from a source 21 enters the detector through an opening 22, passes through a channel 24, glass plate 26 and exits through opening 28. However, in passing through plate 26 a small amount of the light (about 5%) is reflected through opening 29 to glass plate 30 which in turn reflects part of the light through an optical band pass dielectric filter 32 and diffuse surface element 34, to photosensitive diode 2. The circuit elements 1 and 3–9 of FIGURE 1 are attached to the detector by means of container 36.

Opening 40 is a sampling opening for other meters, not shown, to make additional measurements. Opening 42 can be used to measure the reflection of the laser or pump light from a target or surface, not shown. Normally opening 42 is blocked off. Opening 44 is used for alignment purposes.

In alignment of the detector, elements 2, 34 and 32 are removed and flood or pump lamps, not shown, of the laser means is sighted through opening 44. Opening 44 is normally blocked off.

Polarization effects can be measured by rotating the container about an axis through the centers of holes 22 and 28 and comparing the readings at various angles.

While the invention has been described with reference to a preferred embodiment thereof, it will be apparent that various modifications and other embodiments thereof will occur to those skilled in the art within the scope of the invention. Accordingly, I desire the scope of my invention to be limited only by the appended claim.

I claim:

A detector comprising: a closed container which is divided into first and second channels by a wall means, said container having first and second aligned holes at opposite ends of each channel, said wall means having a third hole therein and positioned towards one end of the container, said container having a fourth hole on the second channel side which is aligned with said hole in the wall means, a first glass plate which is positioned in the first channel so that part of a beam of light entering the hole in said first channel at the other end of the container will be reflected through the hole in the wall means to a second glass plate, said second glass plate is so positioned in the second channel that the plate will reflect part of the beam of light it receives, an optical band pass dielectric filter and a diffuse surface element positioned in said second channel and disposed for passing said beam of light, a photosensitive diode positioned in the second channel at the other end of the container to receive the light from the diffuse surface element, said diode being connected in a measuring circuit which comprises a source of D.C. voltage, a capacitor, a resistor and said diode connected in a series circuit, a first meter connected in parallel with said resistor for measuring the instantaneous power of said light, and a second meter connected in parallel with said capacitor for measuring total energy of said light.

References Cited
UNITED STATES PATENTS

| | | | |
|---|---|---|---|
| 685,954 | 11/1901 | Tesla | 250—206 X |
| 1,319,292 | 10/1919 | Kunz | 350—202 X |
| 2,237,713 | 4/1941 | Russell | 88—22.5 |
| 2,251,973 | 8/1941 | Beale et al. | 88—23 |
| 2,858,727 | 11/1958 | Stamm et al. | 88—14 |
| 3,157,789 | 11/1964 | Thomas | 88—23 |
| 3,164,056 | 1/1965 | Wick et al. | 88—14 |
| 3,221,592 | 12/1965 | Soules | 88—14 |

FOREIGN PATENTS 1,143,904 10/1957 France.

JEWELL H. PEDERSEN, *Primary Examiner.*

DAVID H. RUBIN, *Examiner.*

W. A. SKLAR, *Assistant Examiner.*